United States Patent [19]

Duvall et al.

[11] 4,213,026
[45] Jul. 15, 1980

[54] AGE HARDENABLE NICKEL SUPERALLOY WELDING WIRES CONTAINING MANGANESE

[75] Inventors: David S. Duvall, Cobalt; William H. King, Higganum; William A. Owczarski, Cheshire, all of Conn.

[73] Assignee: United Technologies Corporation, Hartford, Conn.

[21] Appl. No.: 914,720

[22] Filed: Jun. 6, 1978

Related U.S. Application Data

[62] Division of Ser. No. 731,410, Oct. 12, 1976, abandoned.

[51] Int. Cl.² ............................................... B23K 35/30
[52] U.S. Cl. .................................. 219/75; 219/137 R; 219/137 WM; 219/146.23
[58] Field of Search ..... 219/137 R, 137 WM, 146.23, 219/75

[56] References Cited

U.S. PATENT DOCUMENTS

| | | | |
|---|---|---|---|
| 2,825,793 | 3/1958 | Kee | 219/137 WM |
| 3,163,743 | 12/1964 | Wroth | 219/137 R |
| 3,248,213 | 4/1966 | Smith | 75/171 |
| 3,286,075 | 11/1966 | Kautz | 219/137 WM |
| 3,571,553 | 3/1971 | Godai | 219/146.23 X |
| 3,700,427 | 10/1972 | Hoppin | 75/171 X |
| 3,723,107 | 3/1973 | Richards | 75/171 |
| 3,972,713 | 8/1976 | Muzyka | 75/171 |
| 4,010,309 | 3/1977 | Petersen | 219/146.23 |

*Primary Examiner*—Richard R. Kucia
*Attorney, Agent, or Firm*—Charles E. Sohl

[57] ABSTRACT

A class of age hardenable nickel base alloys for use as filler wires in fusion welding superalloys is described. The alloys contain manganese in levels of from about 0.5 to 3 percent to greatly reduce the incidence of heat-affected zone cracking in the metal being welded. The weld filler alloys also contain significant amounts of aluminum, titanium, tantalum, and columbium, and therefore the resultant welds can be age hardened to relatively high strength levels.

2 Claims, 3 Drawing Figures

AGE HARDENABLE NICKEL SUPERALLOY WELDING WIRES CONTAINING MANGANESE

This is a division of application Ser. No. 731,410, filed Oct. 12, 1976 now abandoned.

DESCRIPTION OF THE PRIOR ART

Nickel base superalloys are widely used in high technology applications such as gas turbine engines. For certain applications it is necessary to join the nickel base superalloy articles together by various welding processes. Great difficulties have been encountered in fusion welding superalloys and these difficulties largely involve cracking during or after the welding process. Cracking commonly occurs both in the fused weld zone and in the parent material adjacent to the weld, i.e., the heat-affected zone. Prior art solutions to the superalloy cracking problem have largely involved the use of crack-resistant filler wire alloys which have relatively low strengths. Addition of these materials to the molten weld pool can successfully reduce the amount of cracking in the fused weld meal. However, cracking is not necessarily prevented in the adjacent parent-metal heat-affected zone. This approach also has an obvious drawback in that the weld zone will always be of lower strength than the superalloy base metals being joined. The low strength nickel-base filler alloys used in the prior art have not generally been of the type which is age hardenable; that is to say the prior art filler wire alloys have generally been low in aluminum, titanium, tantalum and columbium content. Typical of these prior art alloys is that described in U.S. Pat. No. 3,113,021. This alloy contains by weight about 20 percent chromium, about 1 percent iron, about 2.5 percent columbium, about 3 percent manganese, about 0.2 percent silicon, about 0.35 percent titanium, and about 0.03 percent carbon, balance essentially nickel. The combined levels of aluminum, titanium, tantalum and columbium are less than 3 weight percent and this alloy would not exhibit any significant amount of age hardening response. Similar nickel base welding wire compositions are described in the *Metals Handbook*, Volume 6, page 284, however, once again these alloys are not age hardenable to any significant degree. Manganese is not a common alloying addition to age hardenable nickel base superalloys although in certain alloys it may be present in low levels, usually as an impurity.

SUMMARY OF THE INVENTION

This invention involves a class of age hardenable nickel base weld wire compositions which reduce base metal cracking when fusion welding high strength nickel base superalloys. These weld filler alloys have uniquely tailored properties such that, when added during fusion welding, they favorably alter the stress/strain dynamics responsible for cracking the parent-metal heat-affected zone during welding or post-weld heat treatment. A principal benefit is derived from the addition of manganese to the filler alloys to reduce their melting point (solidus temperature). Other alloying elements which lower the solidus or alter properties do not produce the unique benefits of the manganese additions. Weldments made with the filler wires of this invention can be age hardened to high strength levels because of the presence of the elements tantalum, columbium, aluminum, and titanium in the filler materials which precipitate the $\gamma'$ and $\gamma''$ intermetallic compounds. The two basic types of alloys in this invention are those age hardened by the $\gamma' + \gamma''$ phases and those by the $\gamma'$ phase alone. For the $\gamma' + \gamma''$ strengthened filler metals, the broad range of alloy compositions of the invention is, by weight, Ni, 14–22% Cr, 7–18% Fe, 0–5% Co, 0–8% Mo, 0.5–1.5% Al, 0–2.0% Ti, 2–5% Cb, 0–8%, Ta, and 0.5–3.0% Mn where the sum of Al+Ti+Cb+Ta is at least 5%. For the $\gamma'$ hardened materials of the invention, the broad composition range is, by weight, Ni, 14–22% Cr, 5–15% Co, 0–5% Fe, 0–8% Mo, 0.7–3% Al, 0.5–4% Ti, 0–6% Cb+Ta, and 1.5–3.0% Mn with the sum of Al+Ti at least 3%. The $\gamma' + \gamma''$ filler wires are preferred when maximum weldability is required, along with high strength at intermediate use temperatures. The $\gamma'$ hardened filler alloys provide improved weldability with the greatest possible high-temperature strength.

DESCRIPTION OF THE PREFERRED EMBODIMENTS

Figure 1:
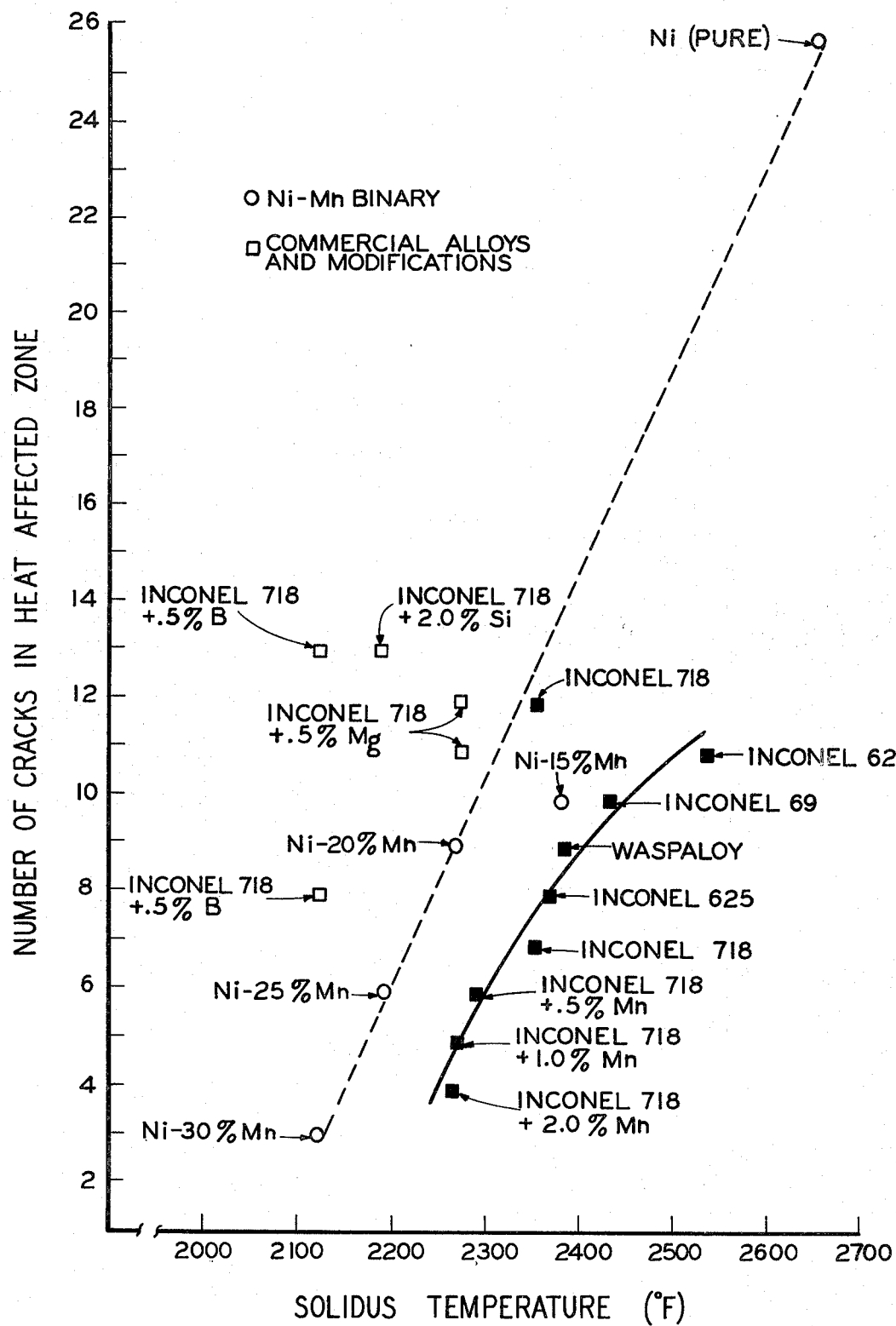
FIG. 1 shows a correlation between the solidus temperature of a series of commercial and experimental nickel-base weld filler alloys and the incidence of heat-affected zone cracking during welding of a nickel base superalloy.

Cracking problems encountered in welding nickel base superalloys can occur either during the solidification which follows the welding process or during subsequent heat treatments. The first type of cracking is called hot cracking and the second is termed post weld heat treatment (PWHT) cracking. Although low strength filler wires are frequently used to minimize the occurrence of both types of cracking in the solidified weld metal, they have not been nearly as successful in alleviating the problem in the heat-affected zone of the parent metal. Research has indicated that the metallurgical events which create a crack sensitive heat-affected zone condition in superalloys are inevitable consequences of the thermal cycles during fusion welding. Hence the best approach to the heat-affected zone problem is to favorably alter the stress/strain dynamics during welding and post weld heat treatment to reduce cracking rather than trying to prevent damaging microstructural changes.

The present invention is related to the discovery that the additions of small amounts of manganese to a certain class of weld wire achieve this and greatly reduce the tendency for both types of heat-affected zone cracking. The weld wire of the present invention is age hardenable to high strength and this feature is in marked contrast to the prior art filler wire compositions used in situations where cracking is a problem. Preferably, the alloys are age hardenable by the precipitation of the ordered body centered tetragonal phase, $Ni_3(Cb, Ta)$ commonly referred to as gamma double prime. This strengthening phase is preferred since the precipitation of the phase occurs relatively slowly, thus permitting a degree of stress relief by plastic accommodation before the strength of the filler wire increases significantly. Additions of small amounts of manganese have also been observed to impart weldability improvements in filler alloys which are strengthened by the formation of the ordered face centered cubic phase, $Ni_3$ (Al, Ti) commonly referred to as gamma prime. This hardening phase is beneficial when high strength is required at temperatures greater than approximately 850° C. (1562° F.).

The alloys of the invention which are hardened by precipitation of the $\gamma'$ phase will contain 14–22% Cr, 5–15% Co, 0–5% Fe, 0–8% Mo, 0.7–3% Al, 0.5–4% Ti, with the sum of Al+Ti being at least 3%, 0–6% Ta+Cb, 0.5–3% Mn, up to 0.1% C, up to 0.05% B and up to 0.10% Zr. Preferably the Mn level will exceed 1.5%, the sum of Al+Ti will exceed 4%, the C level will fall in the range of 0.01–0.04%, the B level will be less than 0.05% and the Zr level will be less than 0.08%. The balance of the alloy will be essentially nickel.

Those alloys of the invention which are hardened by precipitation of the $\gamma''$, with or without the $\gamma'$ phase, will contain 14–22% Cr, 0–5% Co, 7–18% Fe, 0–8% Mo, 0.5–1.5% Al, 0–2% Ti, 2–5% Cb, 0–8% Ta, with the sum of Al+Ti+Cb+Ta exceeding at least about 5%, 0.5–3% Mn, 0–0.1% C, 0–0.05% B, 0–0.10% Zr, balance essentially Ni. Preferably the $\gamma''$ strengthened alloy contains Mn 0.5–2.0%, 0.01–0.04% C, 0.01–0.02% B and 0.01–0.03% Zr.

The addition of manganese is observed to reduce the incidence of both types of superalloy heat-affected zone cracking, despite the fact that manganese is deposited in the weld metal and apparently does not physically or chemically interact with the crack-sensitive heat-affected zone. A theory has been developed to explain the beneficial effect of manganese on heat-affected zone hot cracking. This theory involves the effect of manganese-containing weld zone would solidify at a lower temperature and postpone the build-up of contraction strains until the heat-affected zone had increased its strength and ductility upon cooling. FIG. 1 shows a correlation between the solidus temperature of various weld filler wires and the number of hot cracks observed in the heat-affected zone of the cast superalloy Inco 713c after welding laboratory test specimens under fixed conditions. The tests were designed to be severe enough to cause at least some cracking with all filler wires so that a meaningful comparison could be made. The dotted line shows that the addition of relatively large amounts of manganese to pure nickel greatly reduces the incidence of cracking. The solid line shows a series of alloys which are used commercially for weld wire along with certain commercial alloys to which intentional additions of manganese have been made. The composition of the commercial alloys is given in Table I. A strong correlation can be seen between the solidus temperature and the propensity to crack during welding. Initially it was thought that the solidus temperature along might influence the cracking tendency and a series of alloys based on Inconel 718 were produced in which other alloying elements (silicon, boron, and magnesium) known to reduce the solidus temperature were added. It can be seen, however, from FIG. 1 that despite the reduction of the solidus temperature these alloying elements had a negligible effect on cracking tendency. Hence it appears that the beneficial properties associated with the depression of the solidus temperature are unique to manganese containing compositions.

Based upon these findings, an extensive evaluation was conducted of the welding characteristics and properties of weld wires of the present invention (listed in Table II) along with commercially used alloy compositions.

TABLE I

COMPOSITIONS OF COMMERCIAL NICKEL-BASE SUPERALLOYS AND WELD FILLER WIRES

| Name | Type of Strengthening | Weight Percent (Nominal) | | | | | | | | |
|---|---|---|---|---|---|---|---|---|---|---|
| | | Ni | Cr | Co | Mo | Fe | Al | Ti | Cb | Ta | Mn |
| PARENT-METAL SUPERALLOYS | | | | | | | | | | | |
| Inco 713c | $\gamma'$ ppt. | Bal. | 14 | — | 4.5 | — | 6 | 1 | 2 (Cb + Ta) | — | |
| Waspaloy | $\gamma'$ ppt. | Bal. | 19.5 | 13.5 | 4 | — | 1.4 | 3 | — | — | — |
| WELD FILLER WIRES | | | | | | | | | | | |
| Inconel 625 | Non-ageable | Bal. | 21.5 | — | 9 | 2.5 | 0.2 | 0.2 | 3.65(Cb + Ta) | 0.15 | |
| Hastelloy W | Non-ageable | Bal. | 5 | — | 24.5 | 5.5 | — | — | — | — | |
| Inconel 718 | $\gamma' + \gamma''$ ppt. | Bal. | 18.5 | — | 3 | 18 | 0.6 | 0.9 | 5(Cb + Ta) | 0.2 | |
| Waspaloy | $\gamma'$ ppt. | Bal. | 19.5 | 13.5 | 4 | — | 1.4 | 3 | — | — | — |

TABLE II

COMPOSITIONS OF EXPERIMENTAL NICKEL-BASE WELD FILLER WIRES OF THE PRESENT INVENTION

| Alloy No. | Type of Strengthening | Weight Percent (Measured) | | | | | | | | | |
|---|---|---|---|---|---|---|---|---|---|---|---|
| | | Ni | Cr | Co | Mo | Fe | Al | Ti | Cb | Ta | Mn |
| 1 | $\gamma' + \gamma''$ ppt. | Bal. | 19 | — | 3.5 | 12 | 1 | 2 | 5 | — | 2 |
| 2 | $\gamma' + \gamma''$ ppt. | Bal. | 19 | — | 3.5 | 12.5 | 1 | — | 4.8 | 7.2 | 0.5 |
| 3 | $\gamma' + \gamma''$ ppt. | Bal. | 19.7 | — | 3.6 | 15.3 | 0.7 | 1 | 3.25 | 5.3 | 1.2 |
| 4 | $\gamma' + \gamma''$ ppt. | Bal. | 19.2 | — | 3.6 | 15 | 0.7 | — | 3.15 | 3.15 | 0.7 |
| 5 | $\gamma'$ ppt. | Bal. | 19.5 | 13.5 | 4 | — | 1.4 | 3 | — | — | 2 |
| 6 | $\gamma'$ ppt. | Bal. | 19 | 7 | 3.5 | — | 1 | 2 | — | — | 2 | nese on the solidus temperature of nickel base superalloys. Manganese generally has a fairly strong effect on the solidus temperature and the addition of 1 percent manganese to a nickel base superalloy will typically depress the solidus temperature by at least 50° C. ($\simeq$90° F.). This reduction in solidus temperature means that a Hot cracking tests were conducted using tapered, castto-shape specimens of Inco 713c alloy. The specimens were 3.2 mm (0.125 in.) thick along the location of the test weld. Their tapered width produced a varying amount of restraint (and propensity for cracking) from one end to the other of the weldability test specimen to insure that at least some cracking would be encountered in every test. Following degreasing, the specimens were assembled in a holding fixture for welding, and a controlled amount of the weld filler alloy in question was placed in a machined "v" groove along the location for the test weld. The amount of weld filler wire added was closely measured such that each subsequent weld ended up as a homogeneous mixture of 30–40 volume percent filler alloy with the balance from the melted parent metal. The welds were made automatically by the gas-tungsten arc process in an evacuable welding chamber filled with high purity argon. All welds were carried out at identical parameters: 75 amps welding current; 15 volts welding voltage; and 88.8 mm/min. (3.6 in./min) travel speed. Following welding, the number and location of heat-affected zone hot cracks were determined by optical examination at 25X magnification.

Figure 2:
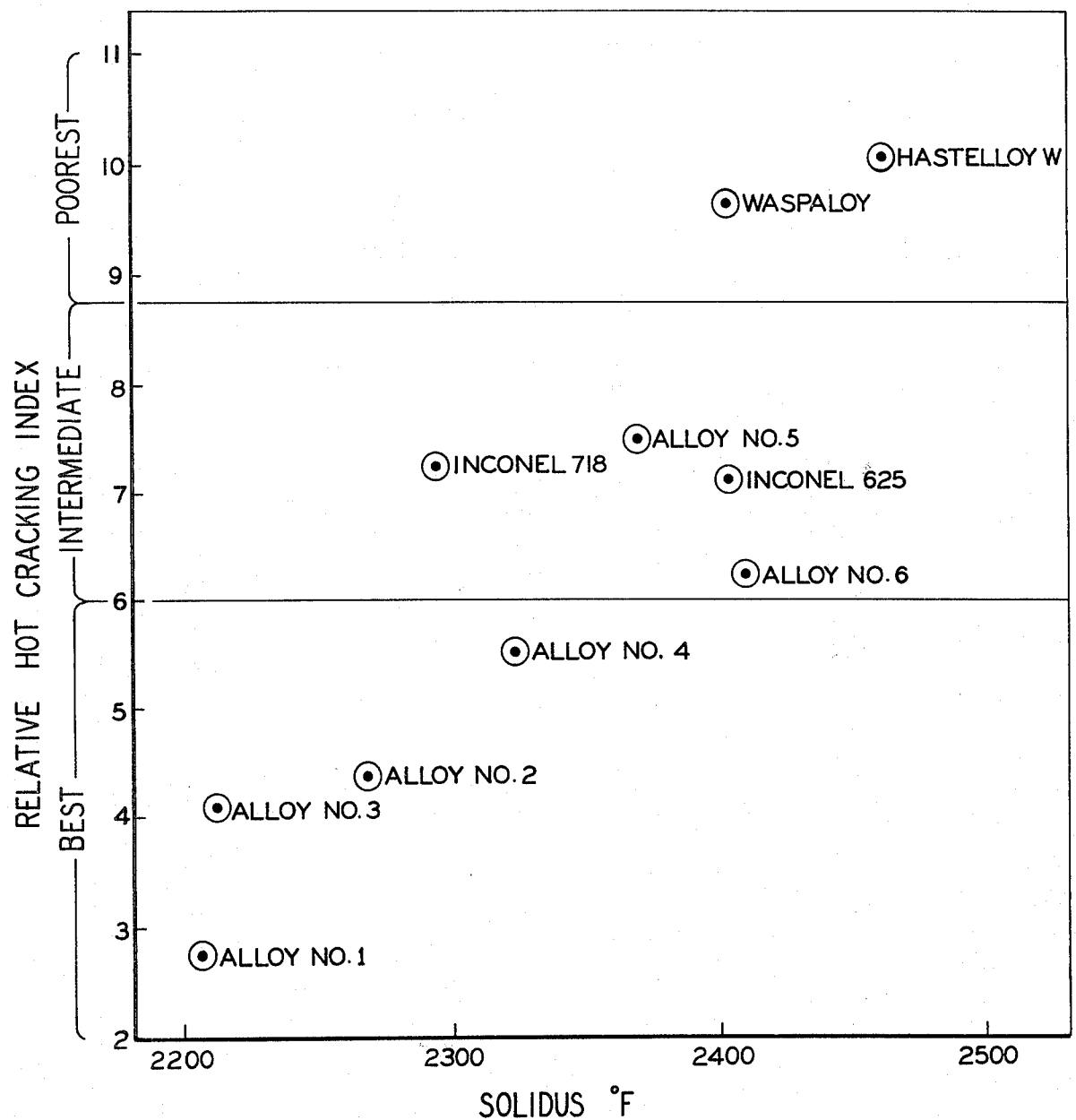
FIG. 2 shows a similar relationship between relative amounts of heat-affected zone hot cracking and weld wire solidus temperatures for the preferred filler alloys of this invention and some commonly employed commercial filler alloys.

The results from these tests confirmed the relationship between the filler wire solidus temperature and the degree of parent metal heat-affected zone hot cracking. FIG. 2 shows that welds made with the $\gamma' + \gamma''$ strengthened filler wires of the present invention (Alloy Nos. 1, 2, 3 and 4) exhibited the least amount of heat-affected zone cracking. Alloys 5 and 6 ($\gamma'$ strengthened filler wires of this invention) and two of the frequently utilized commercial filler wires produced welds with intermediate quantities of cracking, while other commercial filler wires gave poorer results.

Weldability tests were also conducted using Waspaloy ® parent metal to examine the effect of the filler wires of this invention on parent metal cracking during post-weld heat treatments. Waspaloy is a commercial alloy which is difficult to weld. The test specimens consisted of 1.3–1.4 mm (0.051–0.055 in.) thick Waspaloy sheet attached to 33 mm (1.3 in.) thick austenitic steel strongbacks to provide high degrees of restraint and residual welding stresses during post-weld heat treatment. The octagonal shaped Waspaloy test specimens, 114.5 mm (4.5 in.) across faces, were first attached to the 133.4 mm (5.25 in.) diameter circular strongbacks by welding along the octagonal perimeter. A circular "U"-shaped groove, 50.8 mm (2.0 in.) in diameter, was machined around the center of specimen to provide a location for the test weld. The groove dimensions gave a subsequent weld consisting of 45–55 volume percent filler wire with the balance from the parent metal. The test welds were made by the manual gas-tungsten arc process using a rotating table, argon shielding, and the following parameters: welding current, 30 amps; weld travel speed, 88.8 mm/min. (3.6 in. min.). Following welding and inspection, the test specimens attached to the strongbacks were heated at an average rate of 9.5° C./min. (17° F./min.) to 843° C. (1550° F.) and held for four hours in a furnace atmosphere of argon. Upon cooling in still air to room temperature, the test welds were inspected visually for evidence of cracking during the post-weld heat treatment.

Analysis of post-weld heat treatment tests showed that Alloys 3 and 4 of the present invention best reduced parent metal cracking. Alloys 1, 2, and 6 had an intermediate effect, while Alloy 5 was less satisfactory. In comparison, the commercial filler wire Hastelloy W also gave good results, the Inconel 625 and Inconel 718 filler wires were in the intermediate category, and Waspaloy was least satisfactory.

Relative weld strengths were ascertained by testing castings composed of 50 weight percent filler alloy and 50 percent Waspaloy to represent diluted welds. Yield strengths were measured at 843° C. (1550° F.) by compressive loading. Results for some of the representative filler alloys are listed in Table III. It can be seen that the precipitation strengthened filler wires of the present invention provide considerably greater weld strength than is attainable with the non-age hardenable commercial filler wires.

The relative ranking of the alloys of the present invention compared to certain commercially used filler wires is listed in Table IV with respect to effects on both postweld heat treatment cracking and hot cracking. Table IV also compares the relative strength of the various filler alloys at both intermediate (e.g., 550°–850° C. or 1022°–1562° F.) and high temperatures e.g., greater than 850° C. (1562° F.).

It can be seen that the $\gamma' + \gamma''$ strengthened experimental filler wires (Alloys 1–4) provide the best improvement to the heat-affected zone hot cracking problem and are as effective as any of the commercial alloys in alleviating post-weld heat treatment cracking.

Although the Hastelloy W filler wire also effectively reduced post-weld heat treatment cracking, weld strength was low because of this alloy's non-age hardenable character.

TABLE III

EFFECT OF FILLER WIRE ON ElEVATED-TEMPERATURE STRENGTH

| | 843° C. (1550° F.) |
|---|---|
| Test Temperature: | Cast alloy of 50% filler alloy |
| Test Material: | and 50% Waspaloy |
| FILLER ALLOY | 0.2% YIELD STRENGTH |
| Alloy No. 2 | 549.6 N/mm² (79.7 ksi) |
| Alloy No. 3 | 464.7 (67.4) |
| Alloy No. 4 | 443.3 (64.3) |
| Inconel 625 | 319.9 (46.4) |
| Hastelloy W | 204.1 (29.6) |
| Inconel 718 | 393.0 (57.0) |
| Waspaloy | 508.9 (73.8) |

TABLE IV

RELATIVE RANKING OF EFFECTS OF EXPERIMENTAL AND COMMERCIAL WELD FILLER WIRES ON WELDMENT CRACKING AND STRENGTH

| | | Relative Ranking of Benefit* | | | |
|---|---|---|---|---|---|
| | | Cracking | | Strength | |
| Alloy Name | Type of Strengthening | Hot | Postweld | Inter. Temp. | High Temp. |
| Alloy No. 1 | $\gamma' + \gamma''$ ppt. | 1 | 2 | 1 | 2 |
| Alloy No. 2 | $\gamma' + \gamma''$ ppt. | 1 | 2 | 1 | 2 |
| Alloy No. 3 | $\gamma' + \gamma''$ ppt. | 1 | 1 | 1 | 2 |
| Alloy No. 4 | $\gamma' + \gamma''$ ppt. | 2 | 1 | 1 | 2 |
| Alloy No. 5 | $\gamma'$ ppt. | 2 | 3 | 1 | 1 |
| Alloy No. 6 | $\gamma'$ ppt. | 2 | 2 | 2 | 1 |
| Inconel 625 | Non-ageable | 2 | 2 | 3 | 3 |
| Hastelloy W | Non-ageable | 3 | 1 | 3 | 3 |
| Inconel 718 | $\gamma' + \gamma''$ ppt. | 2 | 2 | 1 | 2 |
| Waspaloy | $\gamma'$ ppt. | 3 | 3 | 1 | 1 |

*Relative Scale:
1 = Best
2 = Intermediate
3 = Poorest

Figure 3:
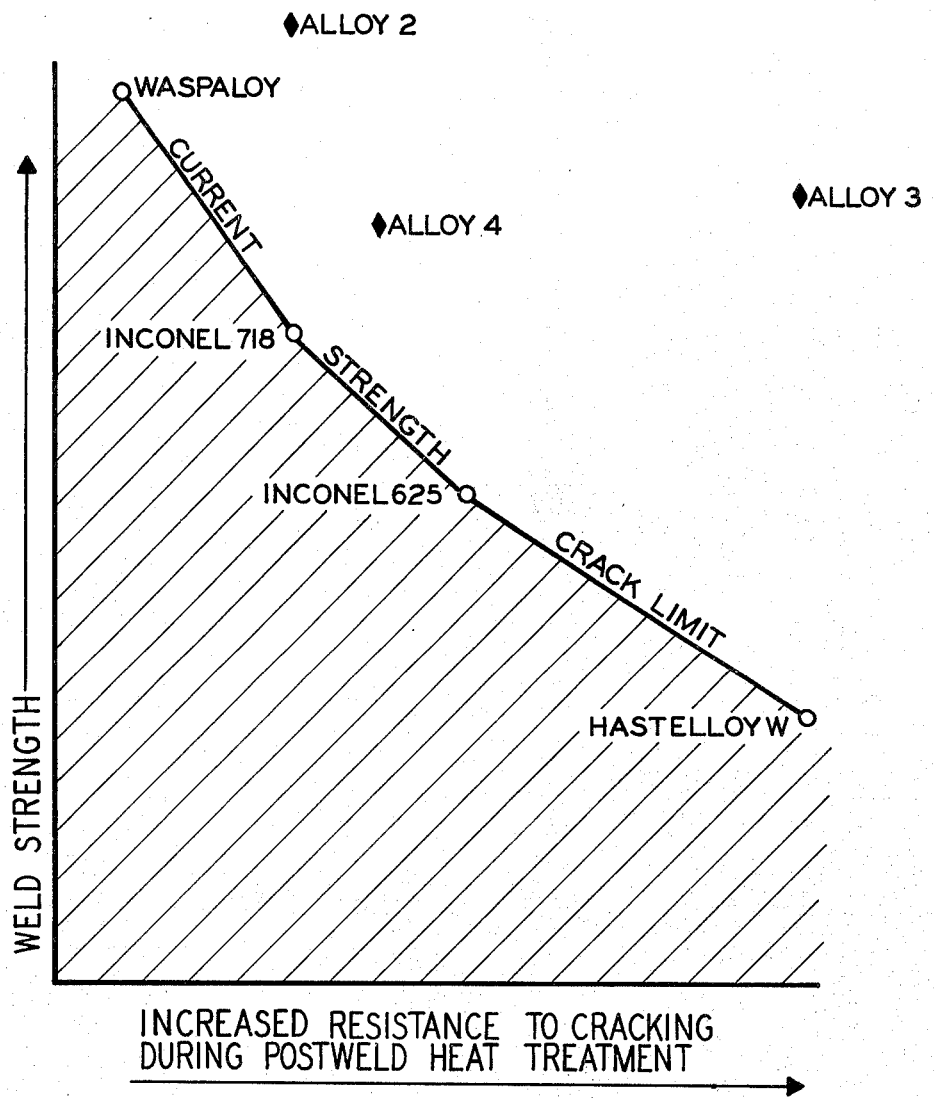
FIG. 3 shows a correlation between the weld strength and the resistance to post-weld heat treatment cracking of the prior art alloys and the alloys of the present invention.

High strength welds could be achieved by use of Waspaloy filler wire, but the propensity for post-weld heat treatment cracking would be great. This relationship between weld strength and heat treatment cracking tendency is depicted in FIG. 3—a plot of approximate weld strength and semiquantitative cracking results for several weld wires. FIG. 3 shows that the filler alloys of the present invention exceed the current weld strength/cracking resistance limitation as defined by the four baseline commercial filler wire alloys. For instance, Alloy 3 gave cracking resistance equivalent to the best commercial filler wire, Hastelloy W, combined with an estimated weld strength over twice that of Hastelloy W (Table III). Alloy 2 was equivalent to Inconel 718 filler wire in effect on post-weld heat treatment cracking but was approximately 40 percent stronger. In fact, it produced the strongest weld material tested at 843° C. (1550° F.). The $\gamma'$ strengthened filler wires of the present invention do not significantly increase resistance to post-weld heat treatment cracking. However, they provide a means for achieving welds with good strengths at high temperature while reducing the amount of hot cracking commonly encountered when attempting to use current heat resistant, $\gamma'$ strengthened filler wires such as Waspaloy (Table IV). Thus, both the $\gamma'$ and $\gamma'+\gamma''$ strengthened filler wires of this invention allow greater utility in the application of fusion welding for fabrication and repair of superalloys with poor weldability than is possible with existing methods.

Although the invention has been shown and described with respect to a preferred embodiment thereof, it should be understood by those skilled in the art that various changes and omissions in the form and detail thereof may be made therein and thereto without departing from the spirit and the scope of the invention.

We claim:

1. A method for reducing cracking in the gaseous tungsten arc welding of nickel base superalloy articles using age hardenable nickel base filler material which consists essentially of 14-22% Cr, 5-15% Co, 0-5% Fe, 0-8% Mo, 0.7-3% Al, 0.5-4% Ti, 0-6% Ta+Cb, 0.5-3% Mn, 0-0.1% C, 0-0.05% B, 0-0.1% Zr, with the sum of Al+Ti exceeding 3%, balance essentially Ni.

2. A method for reducing cracking in the gaseous tungsten arc welding of nickel base superalloy articles using age hardenable nickel base filler material which consists essentially of 14-22% Cr, 0-5% Co, 7-18% Fe, 0-8% Mo, 0.5-1.5% Al, 0-2% Ti, 2-5% Cb, 0-8% Ta, 0.5-3% Mn, 0-0.1% C, 0-0.05% B, 0-0.08% Zr, Al+Ti+Cb+Ta in excess of 5%, balance essentially Ni.

* * * * *